US011854357B2

(12) United States Patent
Madden et al.

(10) Patent No.: US 11,854,357 B2
(45) Date of Patent: *Dec. 26, 2023

(54) OBJECT TRACKING USING DISPARATE MONITORING SYSTEMS

(71) Applicant: Alarm.com Incorporated, Tysons, VA (US)

(72) Inventors: Donald Madden, Columbia, MD (US); Daniel Todd Kerzner, McLean, VA (US); Stephanie Sun Kinney, Falls Church, VA (US)

(73) Assignee: Alarm.com Incorporated, Tysons, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/104,401

(22) Filed: Feb. 1, 2023

(65) Prior Publication Data

US 2023/0169837 A1 Jun. 1, 2023

Related U.S. Application Data

(63) Continuation of application No. 17/235,298, filed on Apr. 20, 2021, now Pat. No. 11,587,417, which is a (Continued)

(51) Int. Cl.
G08B 13/196 (2006.01)
G06F 18/22 (2023.01)

(52) U.S. Cl.
CPC ....... *G08B 13/19608* (2013.01); *G06F 18/22* (2023.01); *G08B 13/19645* (2013.01); *G08B 13/19684* (2013.01); *G08B 13/19686* (2013.01)

(58) Field of Classification Search
CPC ........ G08B 13/19608; G08B 13/19645; G08B 13/19684; G08B 13/19686; G06F 18/22
(Continued)

(56) References Cited

U.S. PATENT DOCUMENTS 9,871,692 B1 1/2018 Hutz
2005/0093999 A1 5/2005 Yamaya
(Continued)

FOREIGN PATENT DOCUMENTS

EP 2822272 1/2015
FR 3055457 3/2018
WO WO 2018/080650 5/2018

OTHER PUBLICATIONS

AU Notice of Acceptance in Australian Appln. No. 2019295856, dated May 24, 2023, 3 pages.
(Continued)

*Primary Examiner* — Brian Wilson
(74) *Attorney, Agent, or Firm* — Fish & Richardson P.C.

(57) ABSTRACT

Methods, systems, apparatus, and computer programs, for tracking objects are disclosed. In one aspect, a method is disclosed that includes actions of obtaining an image, determining that a user of a first monitoring system has opted-in for object tracking by a second monitoring system that is remote from the first monitoring system, and based on a determination that the user of the first monitoring system has opted-in for object tracking: determining whether the obtained image satisfies a predetermined level of similarity to a stored tracking object image model stored on a first device of the first monitoring system, and based on a determination that the obtained image satisfies a predetermined level of similarity to the stored tracking object image model, generating a tracking update notification, and transmitting the tracking update notification to the second monitoring system that is remote from the first monitoring system.

18 Claims, 5 Drawing Sheets

Related U.S. Application Data continuation of application No. 16/459,489, filed on Jul. 1, 2019, now Pat. No. 11,011,036.

(60) Provisional application No. 62/692,629, filed on Jun. 29, 2018.

(58) Field of Classification Search
USPC .................. 382/100, 103; 348/143, 159, 161
See application file for complete search history.

(56) References Cited

U.S. PATENT DOCUMENTS

| | | | |
|---|---|---|---|
| 2012/0257061 A1* | 10/2012 | Edwards | G08B 13/00 348/E7.085 |
| 2013/0162818 A1 | 6/2013 | Lai et al. | |
| 2014/0200805 A1 | 7/2014 | Modica et al. | |
| 2015/0073702 A1 | 3/2015 | Jouaux et al. | |
| 2015/0078618 A1 | 3/2015 | Kim | |
| 2017/0108341 A1 | 4/2017 | Dewis et al. | |
| 2018/0218582 A1* | 8/2018 | Hodge | G06F 16/7837 |

OTHER PUBLICATIONS

EP Office Action in European Appln. No. 19745392.1, dated Dec. 7, 2022, 8 pages.

International Search Report and Written Opinion in International Application No. PCT/US2019/040192, dated Oct. 11, 2019, 15 pages.

* cited by examiner

300

| OBTAIN AN IMAGE MODEL THAT REPRESENTS AN OBJECT TO BE TRACKED 310 |

| OBTAIN IMAGES GENERATED FROM A CAMERA AT MULTIPLE DIFFERENT PROPERTY MONITORING SYSTEMS 320 |

| IDENTIFY A SUBSET OF THE OBTAINED IMAGES THAT DEPICT AN IMAGE OF THE OBJECT REPRESENTED BY THE IMAGE MODEL 330 |

| OBTAIN, FOR EACH IMAGE IN THE SUBSET OF OBTAINED IMAGES, TRACKING DATA THAT INCLUDES (I) A TIME THE IMAGE WAS CAPTURED AND (II) A LOCATION OF THE PROPERTY MONITORING SYSTEM HAVING A CAMERA THAT CAPTURED THE IMAGE 340 |

| GENERATE, BASED ON THE TRACKING DATA, A PROJECTED ROUTE FOR THE OBJECT REPRESENTED BY THE IMAGE MODEL 350 |

| GENERATE A NOTIFICATION, FOR TRANSMISSION TO A USER DEVICE, THAT INCLUDES STATUS INFORMATION RELATED TO THE OBJECT REPRESENTED BY THE IMAGE MODEL 360 |

FIG. 3

OBJECT TRACKING USING DISPARATE MONITORING SYSTEMS

CROSS-REFERENCE TO RELATED APPLICATIONS

This application is a continuation of U.S. application Ser. No. 17/235,298, filed Apr. 20, 2021, which is a continuation of U.S. application Ser. No. 16/459,489, filed Jul. 1, 2019, now U.S. Pat. No. 11,011,036, issued May 18, 2021, which claims the benefit of claims the benefit of the U.S. Provisional Patent Application No. 62/692,629 filed Jun. 29, 2018 and entitled "OBJECT TRACKING USING DISPARATE MONITORING SYSTEMS." The complete disclosures of all of the above patent applications are hereby incorporated by reference in their entirety for all purposes.

BACKGROUND

Conventional property monitoring systems can be used to monitor sensor data generated by one or more sensors installed at a property. In conventional systems, the property monitoring system, when armed, can trigger an alarm in response to sensor data generated by a contact sensor, motion sensor, or a glass break sensor indicating that a potentially unauthorized person has entered the property.

SUMMARY

A remote monitoring system for analyzing image data from surveillance cameras of multiple different properties to detect and track objects passing through the street adjacent to the respective properties. In some implementations, an opt-in mode enables a components of a local monitoring system to receive one or more image models representing a respective object from a remote monitoring system that can be used to facilitate object tracking. Cameras of the local monitoring system can store the image model, and determine whether an image captured by the camera depicts the object represented by the image model. If camera determines that the captured image does not include the object represented by the image model, then the camera may ignore the captured image. If the camera determines that the captured image does depict the object represented by the image model, then the camera may generate and transmit a tracking update notification to the remote monitoring system indicating that the object has been detected by the property's cameras. The tracking update notification can include a location of the camera that detected the object and a time stamp indicating the time the object was detected.

The remote monitoring system can analyze a plurality of tracking update notifications from multiple different cameras of multiple different local monitoring systems to determine a trajectory for the tracked object. Responsive to a request from a user, the remote monitoring system can plot a route based on the determined trajectory on a map of a navigation application running on a user device as either a web application or a mobile application. The remote monitoring system can generate alerts for transmission to, and display on, the user device based on the tracked objects adherence to, or deviation from, the determined route.

According to one innovative aspect of the present disclosure, a monitoring system for tracking objects is disclosed. The monitoring system can include one or more processors and one or more computer storage media storing instructions that are operable, when executed by the one or more processors, to cause the one or more processors to perform operations. In one aspect, the operations can include obtaining, by a first device of a first monitoring system that is configured to monitor a first property, an image, determining, by the first device and based on first profile information stored by the first monitoring system, that a user of the first monitoring system has opted-in for object tracking by a second monitoring system that is remote from the first monitoring system, and based on a determination, by the first device and based on the first profile information stored by the first monitoring system, that the user of the first monitoring system has opted-in for object tracking by the second monitoring system that is remote from the first monitoring system: determining, by the first device, whether the obtained image satisfies a predetermined level of similarity to a stored tracking object image model stored on the first device, based on a determination, by the first device, that the obtained image satisfies a predetermined level of similarity to the stored tracking object image model stored by the first device, generating, by the first device, a tracking update notification, and transmitting, by the first device, the tracking update notification to the second monitoring system that is remote from the first monitoring system.

Other aspects include corresponding methods, apparatus, and computer programs to perform actions of methods defined by instructions encoded on computer storage devices.

These and other versions may optionally include one or more of the following features. For example, in some implementations, the operations can further include obtaining, by the first device of the first monitoring system that is configured to monitor the first property, a different image, and based on a determination, by the first device, that the obtained different image does not satisfy a predetermined level of similarity to the stored tracking object image model stored by the first device, determining, by the first device, to not generate a tracking update notification for transmission to the second monitoring system that is remote from the first monitoring system.

In some implementations, determining, by the first device and based on second profile information stored by the first monitoring system, that a user of the first monitoring system has opted-out for object tracking by a second monitoring system that is remote from the first monitoring system, and based on a determination, by the first device and based on the second profile information stored by the first monitoring system, that the user of the first monitoring system has opted-out for object tracking by the second monitoring system that is remote from the first monitoring system: determining, by the first device, whether the obtained image satisfies a predetermined level of similarity to a stored tracking object image model stored on the first device, and based on a determination, by the first device, that the obtained image satisfies a predetermined level of similarity to the stored tracking object image model stored by the first device, generating, by the first device, a status notification for transmission to a user device, and transmitting, by the first device, the status notification to the user device.

In some implementations, the operations can further include based on a determination, by the first device, that the obtained image does not satisfy a predetermined level of similarity to the stored tracking object image model stored by the first device, determining, by the first device, to not generate a status notification for transmission to the user device.

In some implementations, the first device can be a camera.

In some implementations, the first device can be a monitoring system control unit.

In some implementations, the stored tracking object image model stored by the first device can be received from the second monitoring system that is remote from the first monitoring system.

In some implementations, the stored tracking object image model stored by the first device includes a second image depicting an object.

In some implementations, the stored tracking object image model stored by the first device includes a first set of image features extracted from a second image, wherein the extracted set of features identifies an object.

In some implementations, determining, by the first device, whether the obtained image satisfies a predetermined level of similarity to a stored tracking object image model stored on the first device can include extracting, by the first device, a second set of features from the obtained image, determining, by the first device, a level of similarity that exists between the first set of features extracted from the second image and the second set of features extracted from the obtained image, and determining, by the first device, whether the level of similarity satisfies a predetermined threshold.

In some implementations, the stored tracking object image model stored by the first device includes a neural network that has been trained to determine whether an obtained image, provided as an input to the neural network, depicts a particular object.

In some implementations, the stored tracking object image model stored by the first device includes an obfuscated representation of a second image depicting an object.

In some implementations, the tracking update notification includes (i) a location of the first device that obtained the image and (ii) a time stamp indicating a time the obtained image was obtained.

In some implementations, the second monitoring system can be configured to: (i) aggregate a plurality of received tracking update notifications from multiple different monitoring systems, wherein the plurality of received tracking update notifications include the tracking update notification received from the first device, and (ii) determine a trajectory for the tracked object based on (i) location information and (ii) timestamp information included in each of the aggregated tracking update notifications.

In some implementations, the second monitoring system can be configured to generate rendering data that, when rendered by a user device, causes the user device to display map that includes visually identifiable information that describes a route of an object that is based on the determined trajectory, and provide, by the second monitoring system, the generated rendering data to the user device.

These and other aspects of the present disclosure are further described in the detailed description, the drawings, and in the claims.

BRIEF DESCRIPTION OF THE DRAWINGS

FIG. 3 is a flowchart of an example of a process for tracking an object by a monitoring application server that has aggregated tracking update notifications from multiple disparate monitoring systems.

DETAILED DESCRIPTION

Figure 1:
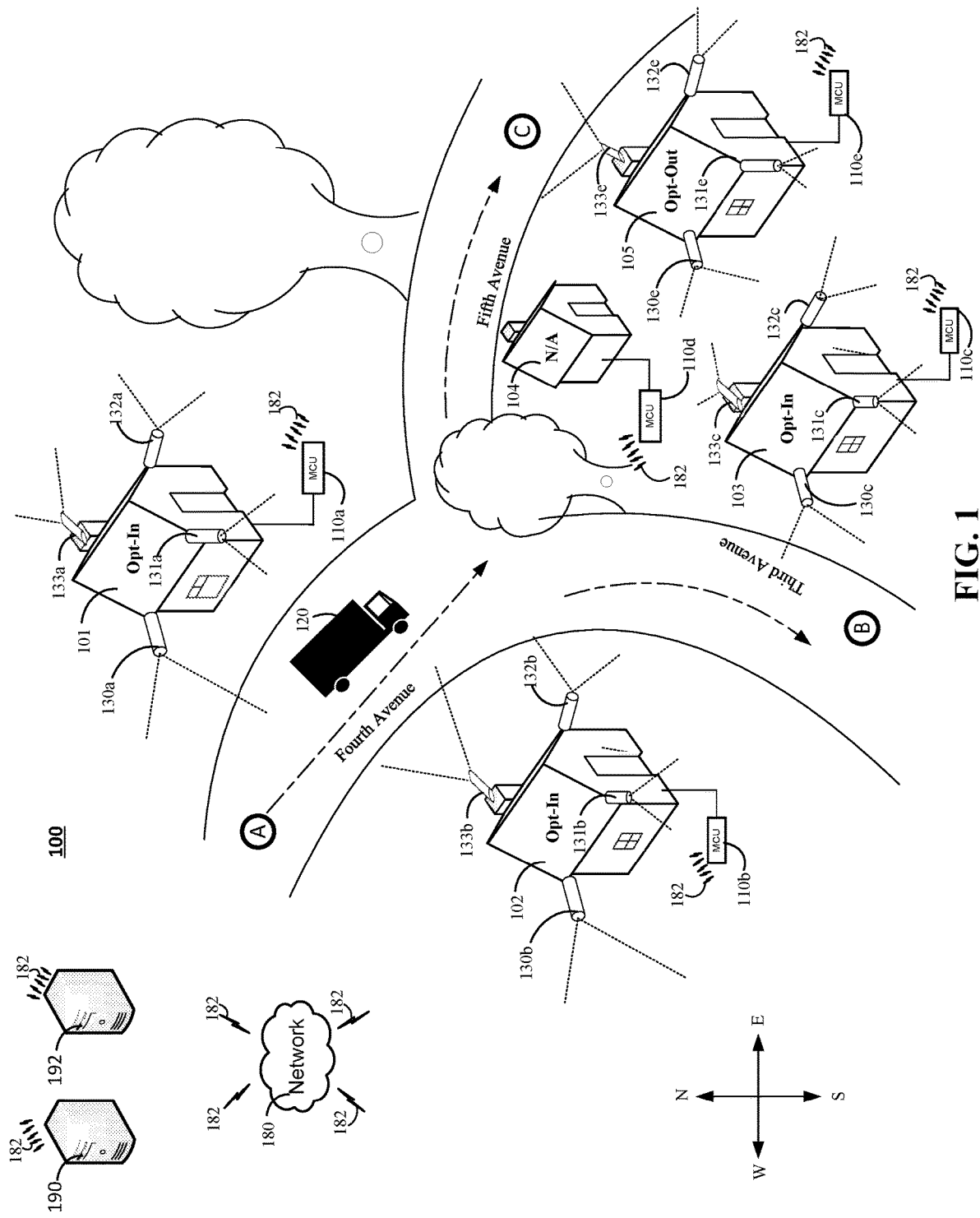
FIG. 1 is a contextual diagram of an example of a system for object tracking using disparate monitoring systems.

FIG. 1 is a contextual diagram of an example of a system 100 for object tracking using disparate monitoring systems. The system 100 includes multiple monitoring system control units 110*a*, 110*b*, 110*c*, 110*d*, 110*e*, zero or more cameras 130*a*-133*a*, 130*b*-133*b*, 130*c*-133*c*, 130*e*3-133*e*, a network 180, a monitoring application server 190, and a central alarm station server 192.

Each respective monitoring system control unit 110*a*, 110*b*, 110*c*, 110*d*, 110*e* can function as a local monitoring unit. For example, each respective monitoring system control unit 110*a*, 110*b*, 110*c*, 110*d*, 110*e* is configured to monitor (i) sensor data generated by sensors installed at a respective property 101, 102, 103, 104, 105, 106, (ii) image data (e.g., images, video, or the like) generated by one or more cameras installed at the respective property 101, 102, 103, 104, 105, 106, or both. Each monitoring system control unit can analyze sensor data, image data, or both, and determine whether an alarm should be triggered at the property where the monitoring system control unit is installed.

Alternatively, or in addition, a monitoring application server 190 can function as a remote monitoring unit. For example, one or more monitoring system control units 110*a*, 110*b*, 110*c*, 110*d*, 110*e* can relay sensor data, image data, or both, to the monitoring application server 190 via one or more networks 180 using one or more communications links 182. The network 180 may include a WAN, LAN, a cellular network, an Ethernet network, a Wi-Fi network, the Internet, or any combination thereof. In such implementations, the monitoring application server 190 may determine, based on received sensor data and image data, whether to instruct one or more particular monitoring system control units 110*a*, 110*b*, 110*c*, 110*d*, 110*e* that provided the sensor data and image data to trigger an alarm.

A remote monitoring unit such as the monitoring application server 190 may be used to monitor sensor data, image data, or both, generated by devices installed at a property in addition to, or in lieu of, a monitoring system control unit 110*a*, 110*b*, 110*c*, 110*d*, 110*e*. In certain instances, a monitoring system control unit need not be installed at a property at all. Instead, in such instances, sensors (e.g., one or more contact sensors, one or more glass break sensors, one or more motion sensors, one or more smoke sensors, one or more water sensors, one or more carbon dioxide sensors, one or more light sensors, or the like) and cameras may generate and transmit sensor data or image data, respectively, that can be obtained and analyzed by the monitoring application server 190. In such instances, the monitoring application server may trigger an alarm at the property lacking a monitoring system control unit by transmitting an alert to a user device (e.g., smart phone, smart watch, tablet, laptop, television, desktop, or the like), digital assistant device (e.g., smart speakers), a drone (e.g., a quadcopter flying drone), or other type of device capable of receiving a message that triggers the device to output audio signals (e.g., audible alarm such as a smart phone alarm/ringer playing audible tones, audible drone output, or the like), visual signals (e.g., visual alarm such as a scrolling message on a display of a television, text notification displayed on a smartphone, drone displaying a video feedback on a drone display device, drone displaying a text message on a drone display device, drone using a projector to display a video or textual message on a surface such as a wall, drone using one or more projectors to display a hologram, or the like), tactile signals (e.g., a vibrating phone), or a combination thereof, that can alert a user to the existence of a potential alarm event.

Once an alarm is triggered, a monitoring system control unit (or monitoring application server 190) that initiated triggering of the alarm may also notify a central alarm station server 192. The central alarm station server 192 may generate alerts that trigger an operator to contact an occupant (or registered user) of the property where the alarm was triggered to get confirmation, from the user, as to whether or not an alarm event is occurring at the property. The central alarm station server 192 (or operator) may contact, dispatch, or both local law enforcement to the property if a confirmed event is occurring at the property where an alarm was triggered.

A user may dynamically configure the extent to which, if any, (i) a local monitoring unit such as a monitoring system control unit, (ii) one or more sensors, (iii) one or more cameras, or a combination thereof, interacts with a remote monitoring unit. Interaction with the remote monitoring unit may include, for example, relaying sensor data, image data, or the like via network 180 using one or more communications links to the remote monitoring unit such as monitoring application server 190 for analysis. Interaction may also include, for example, a camera 130a-133a, 130b-133b, 130c-133c, monitoring system control unit 110a, 110b, 110c, 110d, 110e, or other component of the system 100 transmitting a notification to the remote monitoring unit indicating that the camera has detected a particular object based on an image captured by the camera and a stored object model. The stored object model may include an image of an object, a set of image features describing an object, a neural network that has been trained to determine whether a received image depicts a particular object, or the like. Interaction with the remote monitoring unit may also be described as opting-in to or opting-out of one or more monitoring services provided by the remote monitoring unit.

In one implementations, a remote monitoring unit such as the monitoring application server 190 may provide an object tracking service that a user can opt-in to. The user may be a resident of a property such as property 101 that has subscribed to monitoring services provided made available by the monitoring application server 190. In some implementations, the object tracking system may be based on image models that are provided, by the remote monitoring unit (or other component of system 100) to each respective camera of each respective property that has opted-in to the object tracking service. The image model may include a model that represents an object. For example, the image model may include an image of an object, a set of image features identifying an object that are extracted from an image of the object, a neural network that has been trained to determine whether a received image depicts a particular object, or the like. A camera at a property that has opted-in to the object tracking service may receive, and store, an image model of an object to be tracked by the tracking service, and then determine, using the image model, whether images captured by the camera are within a predetermined level of similarity to the image represented by the image model.

Use of certain image models provides a variety of privacy benefits. For example, certain image models such as a set of image features identifying an object or a neural network that has been trained to determine whether a received image depicts a particular object can be used to obfuscate the object represented by the image model. Thus, when an image module is used that obfuscates the object represented by the image model, a property occupant could access the stored an image model stored by a camera 130a-133a, 130b-133b, 130c-133c of a property that has opted-in to an object tracking service and, based on a review of the image model, not be able to ascertain what object is being tracked using the image model.

A camera 130a-133a, 130b-133b, 130c-133c (or another component of the system 100 such as a monitoring system control unit 110) may determine, based on an image generated by the camera 130a-133a, 130b-133b, 130c-133c and a stored image model whether the image depicts the object represented by the image model. In response to determining that a stored image depicts the object represented by the image model, the camera 130a-133a, 130b-133b, 130c-133c (or another component of the system 100 such as a monitoring system control unit 110) may notify another component of system 100 such as the monitoring application server 190, central alarm station server 192, or a user device that the object being tracked using the image model has been detected. The component of the system 100 such as the monitoring application serve central alarm station server 192, or a user device may update the location of object being tracked using the image model based on the received notification. The notification may include, for example, (i) a location of the camera 130a-133a, 130b-133b, 130c-133c (or another component of the system 100 such as a monitoring system control unit 110) that captured the image that includes the tracked object and (ii) a timestamp.

In other implementations, the object tracking service may (i) aggregate image data (e.g., images, video, or a combination there) generated by cameras at multiple different properties such as property 101, 102, 104 that are associated with a user that has opted-in to the object tracking service, (ii) analyze the aggregated image data to identify the an object, and then (iii) determine a projected route for the object based on a location and timestamp associated with the image data that depicts the object. The object tracking service may then perform one or more operations based on a determination of the projected route for the object. The operations may include, for example, notifying a user that resides along the projected route regarding the status of the object. The status of the object may include, for example, the object's current location, the object's projected location in the future, the object's projected time of arrival at the user's current location, the object's projected time of arrival at the user's property, or any combination thereof. For purposes of this specification, the term "image data" is intended to include still images, video images, a frame of a video image, or a combination thereof, and the term "image" may be used to refer to a still image, a video image, a frame of a video image, or both.

In some implementations, one or more components of the system 100 may obfuscate the exact location of a tracked object at any particular time in order to protect the privacy of an individual camera owners, the tracked object, or both. Thought the exact location of the object is obfuscated, the system 100 can still provide an accurate estimate of the tracked object's progress along the tracked object's route. For example, as a tracked vehicle passes a property A, the system 100 can calculate the approximate the time it will take for the tracked vehicle to reach a property B. Providing such updates allows a higher level of privacy to the opted-in individual cameras being used to facilitate tracking, the tracked object, or both, than other implementations where the system 100 may send an exact location, a full image of the tracked object, or both, that may unintentionally reveal to the owner of property B details about property A such as the existence and location of property A's cameras. Without the use of such obfuscation techniques to protect a property owner's/camera owner's privacy, a property owner/camera owner such as entity A may be dissuaded from opting-in to the tracking service.

With reference to the example of FIG. 1, an example of an object tracking system is depicted that can be used to track an object such as a school bus 120. In the example of FIG. 1, a respective user associated with each of properties 101, 102, and 103 have opted-in to an object tracking service provided by the monitoring application server 190. As a result of being opted-in, or subscribed to, the object tracking service provided by the monitoring application server 190, the monitoring application server 190 (or other component of the system 100) may provide an image model representing an object to be tracked to each of the cameras 130a, 131a, 132b, 131b, 130c. Alternatively, the image model may be provided to each monitoring system control unit 110a, 110b, 110c at each property that is opted-in to the object tracking service. The image model can be used by a camera to detect the presence of a tracked object.

For example, a camera installed at an opted-in property such as camera 131a can generate image data (e.g., images, videos, or both) and then determine, using the received image model stored by the camera 131a (or monitoring system control unit 110a), whether the generated image data depicts a tracked object represented by the stored image model. For example, the camera 131a (or another component of the system 100 such as a monitoring system control unit 110a) may extract a set of image features from the generated image data and determine whether the extracted set of features are sufficiently similar to the set of features of the stored image model representing the tracked object. This may include, for example, determining a distance between each respective set of features in a feature vector space. Alternatively, or in addition, the camera 131a (or another component of the system 100 such as a monitoring system control unit 110a) may provide the generated image data to a neural network that has been trained to detect images depicting a particular object.

By way of example, with reference to FIG. 1 at state A, a camera 131a can receive and store an image model representing a tracking object such as a school bus 120. The camera 131a can determine, for each image (or video) captured by the camera 131a and using the image model, whether the captured image (or video) depicts the school bus 120 represented by the image model. If the camera 131a determines that the captured image does not depict the school bus 120 represented by the image model, then the camera 131a may ignore the image. Alternatively, if the camera 131a determines that the captured image depicts the school bus 120, then the camera 131a (or other component of the monitoring system such as the monitoring system control unit 110a) can generate and transmit a tracking update notification to the monitoring application server 190 indicating that the school bus 120 has been detected. The tracking update notification may include tracking data that includes a time the school bus 120 was detected by the camera 131a and a location of the camera that detected the school bus 120. The time the school bus 120 was detected may include a timestamp that is generated by the camera 131a, the monitoring system control unit 110, or other component of the system 100 and representative of the time the camera 131a detected the school bus 120. The location information may include an address of the property that includes the camera 131a that detected the school bus 120, a GPS location of the property that includes the camera 131a that detected the school bus 120, or the like. In some implementations, the monitoring application server can also determine additional data describing the school bus 120 that is depicted in the image. For example, the tracking data determined by the monitoring application server 190 can also include an orientation of the depiction of the tracked object in the image (e.g., heading east, heading west, heading north, heading south, etc.). By way of another example, the monitoring application server 190 can determine additional tracking data such as a GPS location based on property address of a camera received in a tracking update notification.

In some implementations, though a user has opted-in to the remote object tracking service, the actual identity of the tracking object may be obfuscated from the user. For example, in some implementations, a monitoring system component such as a camera 131a, the monitoring system control unit 110a, or other component of the system 100 may merely have a user indecipherable set of image feature or neural network that represents the tracking object. Such an image model may shield the identity of the tracking object from the user.

Shielding of the tracking object in this manner is particularly beneficial when a user who has opted-into the tracking service would like the tracking object to remain private. For example, the user may request that the monitoring system notify him/her when co-worker's car is approaching. In such instances, the user may upload a picture of his co-worker's car to the monitoring application server 190, the monitoring application server 190 may generate an obfuscated image model such as a set of features or neural network, and then the monitoring application server 190 can transmit the obfuscated image model to each camera that is opted-in to the tracking service. Each camera installed at respective properties that have opted-in to the tracking service may then store the obfuscated image model that is used to track the tracking object without actually storing an image of the co-worker's vehicle on each respective camera. By way of another example, a law enforcement agency could put out an all-points bulletin (APB) for a person, a vehicle or the like by requesting that an obfuscated image model be distributed to each respective camera without storing an image of the person, the vehicle, or the like that is being sought by the law enforcement agency.

The monitoring application server 190 can generate, based on received tracking update notifications and the tracking data included therein, a projected route for the object identified by the template data. In some implementations, this may include general route information that is derived from an analysis of tracking data. For example, the monitoring application server 190 can determine that school bus 120 is traveling southeast on fourth avenue based on a determination that the school bus 120 was detected in image data captured by camera 130a at a time T0, then detected in image data captured by camera 131a at a time T1, then detected in image data captured by camera 133b at a time T2, and then detected in image data captured by camera 132b at a time T3. Alternatively, or in addition, the monitoring application server 190 can determine that the school bus 120 is moving southeast on Fourth Avenue based on a determination that the school bus 120 was then detected in image data captured by a camera 130a at a location L0 and then detected in image data captured by camera 133b at L1. Alternatively, or in addition, the monitoring application server 190 can determine that the school bus 120 is moving southeast on fourth avenue based on a determination that the school bus 120 was detected in an image captured by one or more cameras such as camera 130a, and that further analysis performed by the monitoring application server indicates that the school bus 120 is in an orientation that indicates that the school bus 120 is moving southeast on fourth avenue.

In some implementations, the monitoring application server 190 can project the generated route onto a geographical map of a geographic region where the school bus 120 was detected. In some implementations, the monitoring applications server 190 can generate map modification rendering data that, when rendered in using a user device, highlights the generated route on the map of a navigation application interface that is displayed on the user device. The monitoring application server 190 can continue to generate updated map modification rendering data that can be streamed to the user device in order to dynamically update the highlighted route of the tracked object in the navigation application interface that is displayed on the user device In the same, or other, implementations, the monitoring application server 190 can generate messages that can be transmitted to a user device to alert a user to the status of a tracked object such as school bus 120. For example, a user may provide input that can be used to generate a notification rule related to the tracked object (e.g., school bus, mail truck, garbage truck, pizza delivery vehicle, police car, or the like). In some implementations, the creation of notification rules, subscription to alerts from notification rules, or both, may be subject to the approval of a central authority that can receive notification rule creation requests, notification rule subscription requests, or both. Such central authority may receive and respond to such requests using a terminal connected to the network 180, a terminal connected to the monitoring application server 190, a terminal connected to the central alarm station server 192, or a terminal connected to a combination thereof. The terminal may include any client device including a smartphone, a tablet, a laptop computer, a desktop computer, or the like.

For example, a component of the system 100 such as the monitoring application server 190 may automatically recognize requests to create, or subscribe to, a notification rule for a class of restricted vehicles such as a school bus, a police car, an armored car, or the like and prohibit their tracking for public safety reasons. Alternatively, restrictions may be put on the creation of, or subscription to, such vehicles of the restricted class of vehicles to the owner of the vehicle, or other authorized authority. Such restrictions may complicate the process of tracking a carpool member's vehicle, but also help to discourage malicious tracking such as stalking. Other examples of authorization to track vehicles in the restricted class may include a local school district (or other central authority) authorizing the creation of a school bus model, while restricting creation of, or subscription to, tracking notifications providing information regarding the school bus's location to parents of school children along the school bus route. Another example may include prohibiting a request for tracking notifications for a person, while allowing a request for tracking notifications for the person's pet(s).

The notification rule may include data identifying a tracked object (e.g., an image of a particular object to be tracked, text input describing an object to be tracked, a selection of data identifying an object to be tracked, an image model that represents the object to be tracked, or a combination thereof) and a location. Then, when the monitoring application server 190 determines that the tracked object is within a predetermined distance of the location specified by the rule, the monitoring application server 190 can generates a message that alerts the user that the tracked object is nearing. Alternatively, the user can provide input that can be used to generate a rule that notifies the user when the tracked object arrives at a particular location, when a tracked object will arrive at a particular location within a predetermined amount of time, or the like.

With further reference to the example of FIG. 1, the tracking of a tracked object such school bus 120 is generally dependent on the particular users that have opted-in to share the object tracking service provided by the monitoring application server 190. For example, if at stage B, the school bus continues to travel down southwest along Third Avenue, then the school bus 120 can continue to be tracked using the features of the present disclosure using cameras 130b-133b and 130c-133c because the one or more users at the respective properties 102, 103 have opted-in to the object tracking server. However, if, alternatively, at stage C the school bus travels east along Fifth Avenue, then the school bus 120 can no longer be reliably tracked, in at least the short term, because property 104 does not have any cameras installed therefore its opt-in status is "n/a" (or not applicable) and property 105 has opted-out of the object tracking service. If, however, there are additional properties on fifth avenue after property 105 that have cameras installed and have opted-in for the object tracking service, the monitoring application server 190 can resume tracking the school bus 120 based on tracking update notifications from the additional one or more cameras of one or more additional properties once the additional one or more cameras detect the school bus 120 using an image model installed on the additional one or more cameras.

In some implementations, the system 100 may include components such as the monitoring application server 190, one or more cameras 130a, 131a, 132a, 133a, 130b, 131b, 132b, 133b, 130c, 131c, 132c, 133c or a combination thereof, that are programmed to intelligently track objects such as the school bus 120. Intelligently tracking an object such as school bus 120 may include the one or more of the components of the system 100, or the monitoring application server 190 based on information collected from one or more components of the system 100, making one or more inferences regarding a future location of the school bus 120. In some implementations, the system 100 may make such inferences responsive to a determination that the object being tracked is no longer detectable by one or more cameras 130a, 131a, 132a, 133a, 130b, 131b, 132b, 133b, 130c, 131c, 132c, 133c that have opted-in to the object tracking service.

By way of example, the example of system 100 in FIG. 1 includes opted-in cameras 130a, 131a, 132a, 133a, 130b, 131b, 132b, 133b, 130c, 131c, 132c, 133c along Fourth Avenue and Third Avenue. The system 100 may accordingly track the school bus 120 along Fourth Avenue using location information and timestamp information obtained from opted-in cameras. In this example, the school bus 120 may turn down Fifth Avenue towards property 105. In such a scenario, the system 100 cannot collect any tracking information such as location information or timestamp information along Fifth Avenue describing the location of the school bus 120 because the property 104 does not include any cameras and the property 105 has not opted-in to the object tracking service. However, one or more components of system 100 such as the monitoring application server 190 (or one or more cameras 130*a*, 131*a*, 132*a*, 133*a*, 130*b*, 131*b*, 132*b*, 133*b*, 130*c*, 131*c*, 132*c*, 133*c*) may infer that the school bus 120 traveled down Fifth Avenue because one or more cameras 132*b*, 133*b*, 130*c*, 131*c*, 132*c*, 133*c* that are opted-in along Third Avenue have not detected the school bus 120 on Third Avenue within a predetermined time of the school bus's 120 last detected appearance on Fourth Avenue by one or more opted-in cameras 130*a*, 131*a*, 132*a*, 133*a*, 130*b*, 131*b*.

The aforementioned example was directed towards object tracking that tracks a single object such as one or more different types of vehicle. However, the object tracking of the present disclosure is not limited to tracking vehicles. Instead, in some implementations, the object tracking process described herein can also be used to track people (e.g., kids), pets (e.g., dogs, cats, etc.), or any other type of object.

The system 100 can also be used to detect anomalies. Anomalies may include the detection of object activity that departs from a routine. For example, a component of the system 100 can be configured to track an object such as the school bus 120. In such implementations, the monitoring application server 190 may store data, over time, indicating the route that is routinely traveled by the school bus 120 on a typical school day. The route may be generated based on tracking update notifications received, daily, by the monitoring application server 190 from cameras that have been opted-in to the object tracking service. Once a routine route is determined for a tracked object such as a school bus 120, the monitoring application server 190 may determine based on (i) location information and timestamp information included in a subsequently received tracking update notification and (ii) stored location information and timestamp information describing the time the school bus arrives at particular locations on a routine day. Based on this determination, the monitoring application server 190 can generate status update notifications indicating whether the school bus 120 is running late, on-time, running early, has taken wrong term, or the like. The generated status update notification may be ben transmitted to one or more user devices that belong to a user that has opted-in to the object tracking service and asked the monitoring application server 190 to track the school bus 120.

Though an example of determining whether a school bus 120 has departed from a typical routine is provided above, the present disclosure need not be so limited. Instead, for example, the system 100 can be used to track any object and notify a user device that has opted-in to the object tracking service and requested to track the object if the tracking object has departed from a routine route that the object typically travels.

However, the present disclosure need not be limited to determining whether an object has departed from a routine path. In some implementations, the monitoring application server 190 may be given an initial path (e.g., a start and end address) that an object is expected to follow, and then the monitoring application server 190, can track the object using the techniques described above and determine whether the object being tracked has departed from the initial path. For example, the monitoring application server 190 can determine whether the object being tracked has departed from the initial path based on (i) location information and timestamp information included in a subsequently received tracking update notification and (ii) stored location information and timestamp information describing the locations where the tracked object should be based on the received initial path.

In yet other implementations, the system 100 can be used to detect suspicious behavior. For example, an image model can be configured to detect whether a first vehicle has been following too closely to a second vehicle for more than predetermined distance, more than a predetermined amount of time, or the like. By way of example, an image model can be constructed to determine whether a car has been closely following a delivery vehicle for more than a predetermined amount of turns. In some implementations, for example, if a car follows to closely to a delivery truck for more three turns, then a camera can report a tracking update notification that includes data indicating that the delivery truck is potentially being followed. Responsive to receiving a tracking update notification that includes data indicating that the delivery truck is potentially being followed by the car, a component of system 100 such as the monitoring application server (or central alarm station server 192) may dispatch a law enforcement officer to check on the car, the delivery truck, or both.

Figure 2:
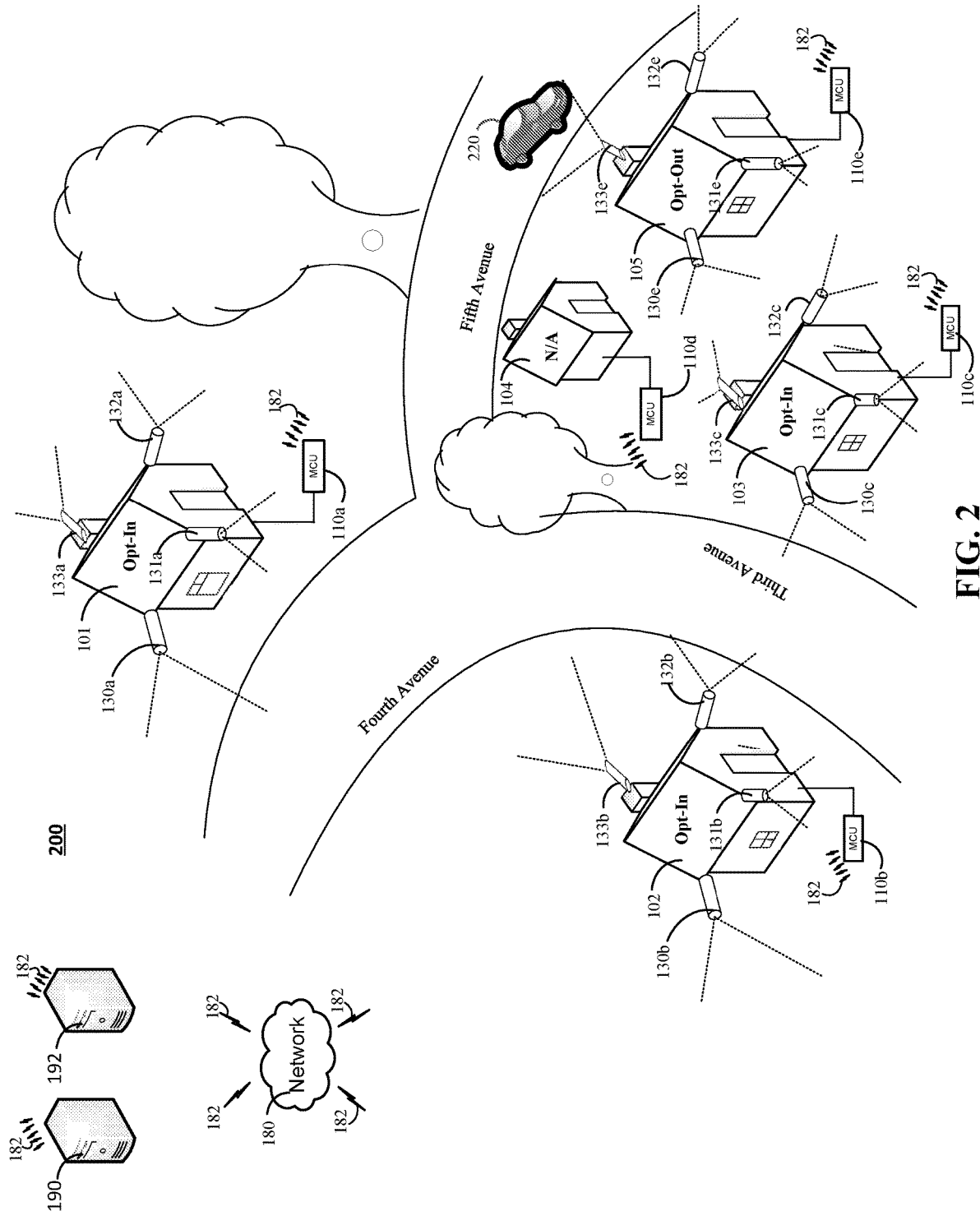
FIG. 2 is a contextual diagram of another example of a system for object tracking using a local monitoring system control unit.

FIG. 2 is a contextual diagram of another example of a system 200 for object tracking using a local monitoring system control unit 110*e*. The system 200 includes the same system components as system 100. However, further description of a local monitoring system control unit 110*e* is provided.

With reference to FIG. 2, a monitoring system control unit 110*e* can obtain image data captured by a camera 133. The monitoring system control unit 110*e* can determine whether a user associated with the property 105 has decided to opt-in for object tracking by a second device such as monitoring application server 190 that is remote from the property 105. In this example, the monitoring system control unit 110*e* can determine, based on profile data storing configuration settings of the monitoring system control unit 110*e*, that the user associated with the property 105 has opted-out of the remote object tracking services provided by the monitoring application server 190. Though the monitoring system control unit 110*e* has opted out of the object tracking service provided by the monitoring application server 190, the monitoring system control unit can also perform object tracking.

In some implementations, the monitoring system control unit 110*e* can be configured to store one or more tracking object image models. The one or more tracking object image models may include data that presents an object to be tracked. The tracking object image model may include an image of an object, a set of image features describing an object, a neural network that has been trained to determine whether a received image depicts a particular object, or the like. The stored tracking object image model may be received from the monitoring application server 190 via one or more networks 180 using one or more communications links 182. Alternatively, the stored tracking object image model may be received from a user device such as a smartphone. For example, a user can use a smartphone to capture an image of an object such as a mail truck 220 and provide the captured image to the monitoring system control unit 110*e* for storage and use in detecting future occurrences of the mail truck 220 at the property 105. By way of another example, the user can use an application on a smartphone to extract a set of features from a captured image of a mail truck 220, and then generate an image model based on the extracted set of features for storage and use in detecting future occurrences of the mail truck 220.

The monitoring system control unit 110e can determine, based on images captured by one or more cameras installed at the property 105 such as camera 133e and one or more locally stored tracking object image models, whether an object being tracked using the locally stored tracking object image models has been detected. In some implementations, determining whether an object being tracked has been detected may include, for example, comparing images obtained by the camera 133e, or any other camera installed at the property 105, to the stored tracking object image model. In some implementations, the camera 133e (or other component of the local monitoring system) may extract a set of features from an image captured by the camera 133e and compare the extracted set of features to a tracking object image model including a set of features representing the object being tracked. In some implementations, an image captured by the camera 133e may be provided to a tracking object image model that comprises a neural network that has been trained to determine whether an image depicts a particular tracking object. In response to determining, by the monitoring system control unit 110e, that an image captured by the camera 133e, or any other camera installed at the property 105, depicts the object that matches the predetermined tracking object image within a predetermined error threshold, then the monitoring system control unit 110e may generate a notifications that can be transmitted to a user device.

The monitoring system control unit 110e may also be configured to perform different types of notifications. For example, instead of generating a notification that is transmitted to a user device to alert a user that an object has been detected, the monitoring system control unit 110e can be configured to generate a notification that is transmitted to a user device to alert the user that an object was not detected.

For example, a user associated with the property 105 may be expecting her daughter to return home in the daughter's vehicle between 5:00 pm and 6:00 pm EST. The user can provide information to the monitoring system control unit 110e that can be used to generate an object tracking rule. Alternatively, in some implementations, the system 100, or a component thereof such as a monitoring application server 190, may automatically capture data necessary to generate an object tracking rule independent of the user's request. For example, the system 100 may generate an object tracking rule based on analysis of images, video, or both, captured by cameras at the property that repeatedly show the daughter's vehicle arriving home between the times of 5:00 pm and 6:00 pm. Such creation of an object tracking rule based on automatically captured data describing repetitive events, or habits, at a property can help provide a level of convenience in create object tracking rules while also helping to ensure that the system 100 is not being used to track strangers. The object tracking rule may include (i) a tracking object image model representing an image of the daughter's vehicle that can be stored by the monitoring system control unit 110e as a tracking object image model and (ii) a time period.

The monitoring system control unit 110e can obtain images from one or more cameras 130e, 131e, 132e, 133e and analyze the one or more images to determine, based on the obtained one or more images and one or more locally stored tracking object image models, whether the images captured by the cameras 130e, 131e, 132e, 133e between 5:00 pm EST and 6:00 pm EST depict the daughter's car. Analyzing the captured images to determine whether the captured images depict the daughter's car may include, for example, determining if an image captured by one or more cameras 130e, 131e, 132e, 133e, or any other camera installed at the property 105, depicts the object that matches tracking object image model representing the daughter's car within a predetermined error threshold. If the monitoring system control unit 110e determines that none of time images captured within the time period of 5:00 pm to 6:00 pm EST depict an object that matches the tracking object image model representing the daughter's car within a predetermined error threshold, then the monitoring system control unit 110e can determine that the daughter's vehicle did not return home to the property 105 at the expected time. In such instances, the monitoring system control unit 110e generate an alert message that can transmitted to a user device of a user that can alert a user that the user's daughter did not return home when expected.

Though specific examples related to a daughter's vehicle and particular time period were used, the present disclosure need not be so limited. Instead, any of the aforementioned systems can be used to alert the user to the lack of occurrence of any type of object represented by a locally stored tracking object image model such as a school bus, a mail truck, a construction vehicle, a police car, or the like within a particular time period. Though a particular time period of 5:00 pm to 6:00 pm was provided, the present disclosure need not be so limited. Instead, a camera may, for example, capture images for an entire 24 hour period and determine whether the predetermined tracking object is depicted by any of the captured images before concluding that an object has not been detected at the property.

FIG. 3 is a flowchart of an example of a process 300 for tracking an object by a monitoring application server that has aggregated tracking update notifications from multiple disparate monitoring systems. The process will be described as being performed by a remote monitoring unit such as a monitoring application server. The monitoring application server may be considered a remote monitoring unit because the monitoring application server processes sensor data, image data, or both, that were generated by sensors or cameras at a location that is remote from the monitoring application server.

Generally, the process 300 includes obtaining, by a remote monitoring unit, an image model that represents an object to be tracked (310), obtaining, by the remote monitoring unit, images generated from multiple respective cameras at multiple different property monitoring systems (320), identifying, by the remote monitoring unit, a subset of the obtained images that depict an image of the object represented by the image model (330), obtaining, by the remote monitoring unit for each image in the subset of obtained images, tracking data that includes (I) a time the image was captured and (II) a location of the property monitoring system having a camera that captured the image (340), generating, by the remote monitoring unit based on the tracking data, a projected route for the object represented by the image model (350), and generating, by the remote monitoring unit, a notification, for transmission to a user device, that includes status information related to the object represented by the image model (360). An example implementation of the process 300 will be further described below as being performed by a monitoring application server such as monitoring application server 190 of FIG. 1 that is remote from one or more properties of a neighborhood that are each monitoring by respective local monitoring systems.

A monitoring application server begin performance of the process 300 by obtaining 310 image model that represents an object to be tracked. The image model can include any model that represents an object. For example, the image model may include an image of an object, a set of image features identifying an object that are extracted from an image of the object, a neural network that has been trained to determine whether a received image depicts a particular object, or the like.

The monitoring application server can continue performance of the process 300 by obtaining 320 images generated from multiple respective cameras at multiple different property monitoring systems. For example, the monitoring application server can obtain one or more images captured by a first camera of a first property monitoring system that is configured to monitoring a first property and one or more images captured by a second camera of a second property monitoring system that is configured to monitoring a second property. The first and second properties can be different properties owned and operated by different entities. The properties may be residential or commercial properties. In some implementations, other than each respective monitoring system's communication with the monitoring application server, the respective monitoring systems each independently monitor the properties with which they are associated. In other implementations, the respective monitoring systems may be configured to cooperatively monitor a set of properties that are related such as by being adjacent properties. Properties may be cooperatively monitored if each monitoring system of a plurality of respective monitoring systems are configured to share information with each other directly or indirectly through an intermediary system.

The monitoring application server can continue performance of the process 300 by identifying 330 a subset of the obtained images that depict an image of the object represented by the image model. For example, the monitoring application server can be configured to perform image analysis on each image of the obtained images to determine which images of the obtained images depict an object that is represented by the image model. The image analysis can include determining a similarity of each image of the obtained images to determine whether the image satisfies a predetermined similarity threshold to image model. If the monitoring application server determines that an image of the obtained images satisfies a predetermined threshold level of similarity when compared to the image model, then the monitoring application server can add the image to the subset of images that depict an image of an object represented by the image model. Alternatively, if the monitoring application server determines that an image of obtained images does not satisfy a threshold level of similarity with respect to the image model, then the monitoring application server can determine that the image should not be added to the subset of obtained images that depict the image of the object represented by the image model.

In yet other implementations, the monitoring application may not need to perform image analyses on the obtained images. Instead, in such implementations, identifying a subset of obtained images that depict an image of the object represented by the image model can be based on information received from the respective monitoring systems that provided the images (or data related to the images). For example, in some implementations, a monitoring system can provide an image to the monitoring application server and metadata along with the image that indicates whether the image depicts an object represented by the image model. Based on such information from the respective monitoring systems, the monitoring application server can determine whether the image should be added to the subset of images depicting the object represented by the image model.

The monitoring application server can continue execution of the process 300 by obtaining 340 tracking data that includes (I) a time the image was captured and (II) a location of the property monitoring system having a camera that captured the image. In some implementations, this information may be associated with a received image. In other implementations, the information may be received as part of a tracking update notification.

The monitoring application server can continue execution of the process 300 by generating a projected route for the object represented by the image model (350). The projected route can be based on the locations the object, as determined by the locations of the object in each of the subset of images obtained at stage 330 at the particular time the image was captured.

The monitoring application server can continue execution of the process 300 by generating 360 a notification, for transmission to a user device, that includes status information related to the object represented by the image model. Status information can include information describing the last known location of the object represented by the image model, a projected heading of the object represented by the image model, or the like.

Figure 4:
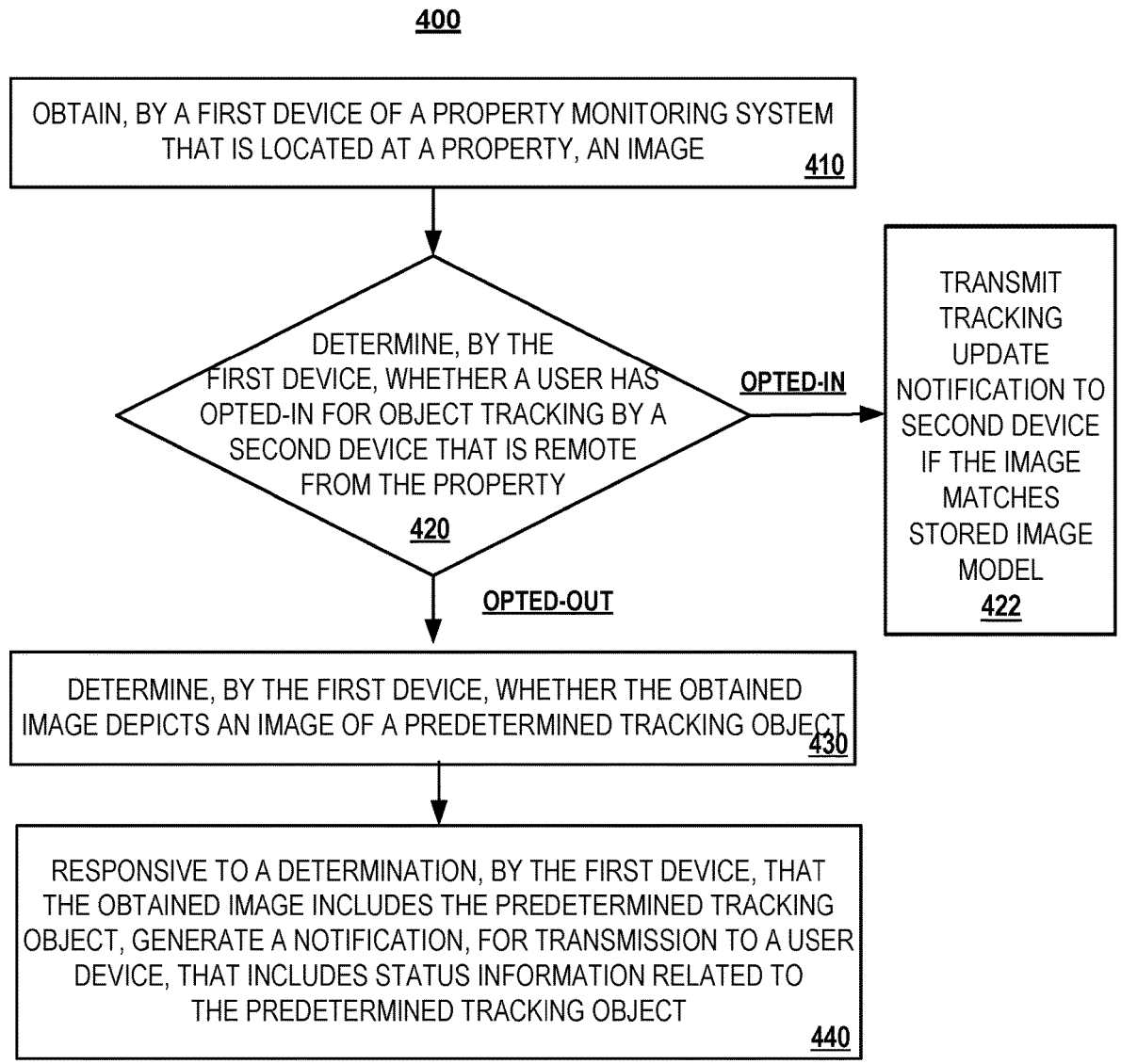
FIG. 4 is a flowchart of an example of a process for generating an alert indicating that a tracked object has been detected by a monitoring system control unit that is local to a property.

FIG. 4 is a flowchart 400 of an example of a process for generating an alert indicating that a tracked object has been detected by a monitoring system control unit that is local to a property. In general, the process 400 includes obtaining, by a first device such as a monitoring system control unit that is local to a property, an image (410) and determining, by the first device, whether a user has opted-in for object tracking by a second device that is remote from the property (420). In response to a determination, by the first device, that the user has opted-in for object tracking by a second device that is remote from the property, transmitting, by the first device, a tracking update notification, if the image is determined to match a stored tracking object image model stored on the first device, to the second device identifying a location the image was captured and a timestamp indicating a time the image was captured (422). In response to a determination, by the first device, that the user has opted-out of object tracking by a second device that is remote from the property, determining, by the first device, whether the obtained image depicts an image of a predetermined tracking object using a tracking object image model that is stored by the first device (or another component of a local monitoring system) (430) and responsive to a determination, by the first device, that the obtained image includes the predetermined tracking object, generating, by the first device, a notification for transmission to a user device, that includes status information related to the predetermined tracking object (440). An example implementation of the process 400 will be further described below as being performed by a system of one or more component devices such as a system 100.

In more detail, a system can begin performing the process 400 by obtaining 410 an image using a first device of the system. The first device of the system can be a camera of a first property monitoring system that is configured to monitor a property where the camera is located. In such implementations, the camera can obtain an image by capturing an image of an area near the first property monitored by the first property monitoring system. In other implementations, the first device that obtains an image can include any other component of the first property monitoring system such as a monitoring system control unit located at the first property monitored by the first property monitoring system. In such an implementation, a camera can capture an image and transmit the captured image to the other component of the property monitoring system.

The system can continue performance of the process 400 by using a component of the first property monitoring system such as a camera or monitoring system control unit to determine 420 whether a user associated with the first property monitoring system has opted-in for object tracking by a second monitoring system that is remote from the first monitoring system. In some implementations, a user can be associated with the first property monitoring system if the user has an account for property monitoring services with an entity such as a company that uses the first property monitoring system to monitor the first property. In some implementations, a user can opt-in for object tracking by toggling one or more parameters of a user account for property monitoring services. The parameters of a user account can be accessible to the user by using a user device to interact with a web page, a web form, a web portal, a mobile application, or the like. An object tracking service can include service that is configured to track an object as the objects location and provide notifications to users that provide an indication of the tracked object.

In some instances, at stage 420, the system can continue execution of the process 400 at stage 422 if it is determined, by a component of the first property monitoring system such as a camera or a monitoring system control unit, that the user has opted-in for object tracking by the second monitoring system that is remote from the first property monitoring system. The component of the first property monitoring system can determine that the user has opted-in for object tracking by the second monitoring system based on first profile information stored by the one or more components of the first monitoring system or other computer. In some implementations, for example, a component of the first system can submit an inquiry to a remote computer, using one or more networks, that stores first profile information describing parameters of the user's account and then determined, based on a response from the remote computer, whether the user has opted-in for object tracking the second monitoring system. Alternatively, the first profile information can be stored on another device the first property monitoring system and made accessible to the first device or other component of the monitoring system via one or more wired or wireless network connections.

Based on determining, by the system, at stage 420 that the user has opted-in for object tracking, the system can use a component of the first monitoring system such as a camera or monitoring system control unit to determine whether the image obtained by the system satisfies a predetermined level of similarity to a stored tracking object model stored on the first device at stage 422. If, at stage 422, the component of first property monitoring system determines that the image obtained by the system satisfies the predetermined level of similarity to the stored object tracking model stored by the first device, then the component of the first property monitoring system can generate a tracking update notification, and transmit the tracking update notification to the second monitoring system that is remote from the first monitoring system. If on the other hand the component of the property monitoring system determines, at stage 422, that the image obtained by the system does not satisfy a predetermined level of similarity to the stored object tracking model, then the system can terminate execution of the process 400.

A generated tracking update notification can include (i) a location of the first device that obtained the image and (ii) a time stamp indicating a time the obtained image was obtained. In some implementations, the second monitoring system can receive multiple tracking update notifications from different monitoring systems that have opted-in for object tracking by the second monitoring system. In such implementations, the second monitoring system can be configured to aggregate a plurality of received tracking update notifications from multiple different monitoring systems. The second monitoring system can determine a trajectory for the tracked object based on (i) location information and (ii) timestamp information included in each of the aggregated tracking update notifications. The second monitoring system can be configured to generate rendering data that, when rendered by a user device, causes the user device to display map that includes visually identifiable information that describes a route of an object that is based on the determined trajectory. The second monitoring system can provide the generated rendering data to the user device.

In other instances, at stage 420, the system can continue execution of the process 400 at stage 430 if it is determined, by a component of the first property monitoring system such as a camera or a monitoring system control unit, that a user of the first monitoring system has opted-out for objet tracking by a second monitoring system that is remote from the first monitoring system. The component of the first property monitoring system can determine that the user has opted-out for object tracking by the second monitoring system based on first profile information stored by the one or more components of the first monitoring system or other computer. In some implementations, for example, a component of the first system can submit an inquiry to a remote computer, using one or more networks, that stores first profile information describing parameters of the user's account and then determine, based on a response from the remote computer, whether the user has opted-out for object tracking the second monitoring system. Alternatively, the first profile information can be stored on another device the first property monitoring system and made accessible to the first device or other component of the monitoring system via one or more wired or wireless network connections.

Based on determining, by the system, at stage 420 that the user has opted-out for object tracking by the second monitoring system that is remote from the first monitoring system, the system can determine, using a component of the first property monitoring system, whether the image obtained by the system satisfies a predetermined level of similarity to a tracking object image model stored on the first device. If, at stage 430, the component of first property monitoring system determines that the image obtained by the system satisfies the predetermined level of similarity to the stored object tracking model stored by the first device, then the component of the first property monitoring system can generate a status notification for transmission to a user device. The status notification can include status information related to a tracking object that is represented by the tracking model. If on the other hand the component of the property monitoring system determines, at stage 430, that the image obtained by the system does not satisfy a predetermined level of similarity to the stored object tracking model, then the system can terminate execution of the process 400.

In this example of FIG. 4, the first device is described as being a local monitoring system control unit. However, the present disclosure need not be so limited. Instead, the first device may include a camera local to the property that captures the image and also performs the remaining stages of process 400.

Figure 5:
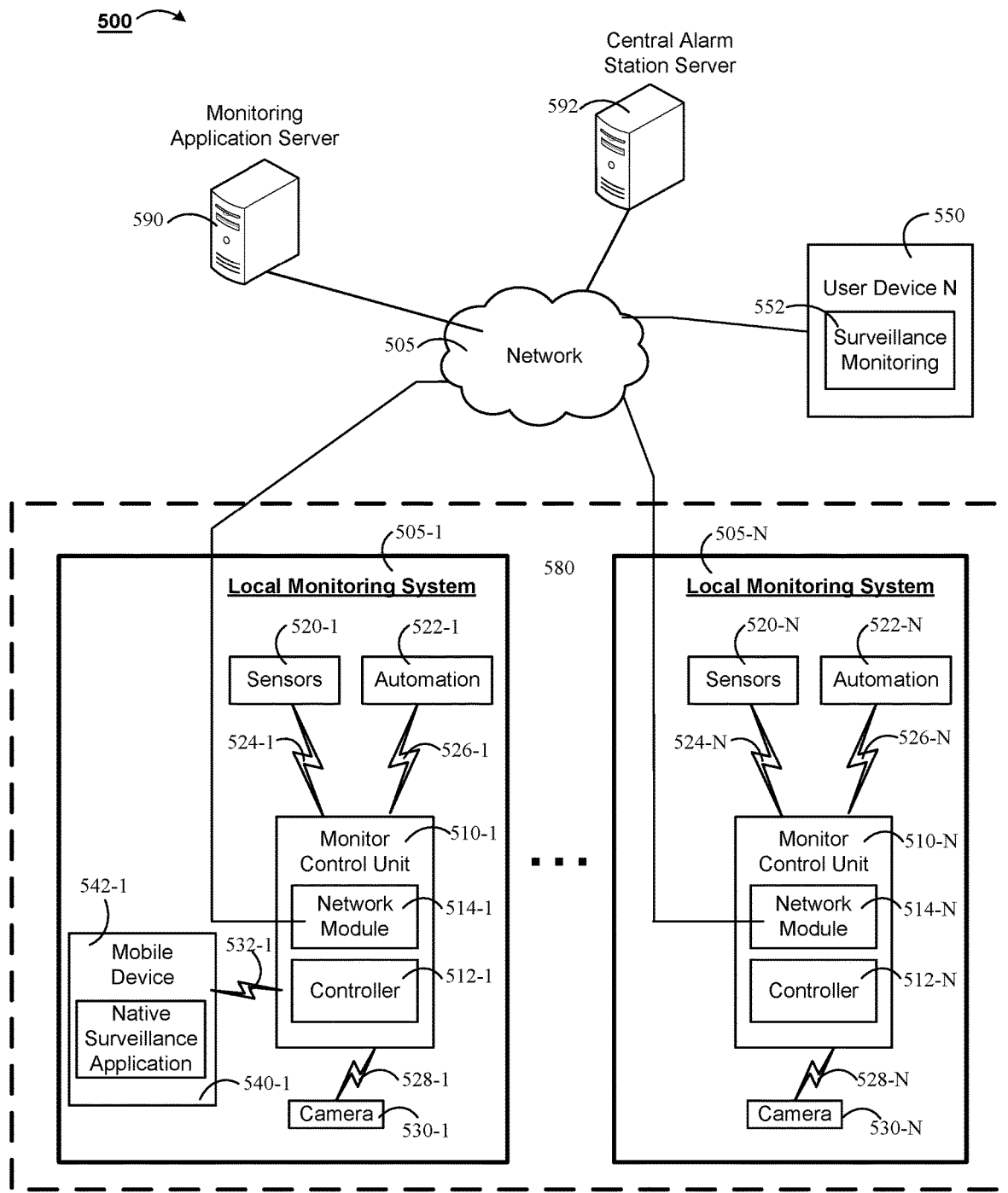
FIG. 5 is a block diagram of system components that can be used to implement a system for object tracking using disparate monitoring systems.

FIG. 5 is a block diagram of system components that can be used to implement a system for object tracking using disparate monitoring systems.

The electronic system 500 includes a network 505, a monitor control unit 510-1, one or more user devices 540-1, 550, monitoring application server 590, and a central alarm station server 592.

The network 505 is configured to enable exchange of electronic communications between devices connected to the network 505. For example, the network 505 may be configured to enable exchange of electronic communications between the monitoring system control unit 510-1, the one or more user devices 540-1, 550, the monitoring application server 590, and the central alarm station server 592. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The monitoring system control unit 510-1 includes a controller 512-1 and a network module 514-1. The controller 512-1 is configured to control a monitoring system (e.g., a home alarm or security system) that includes the monitoring system control unit 510-1. In some implementations, the controller 512-1 may include a processor or other control circuitry configured to execute instructions of a program that controls operation of an alarm system. In these examples, the controller 512-1 may be configured to receive input from sensors, detectors, or other devices included in the alarm system and control operations of devices included in the alarm system or other household devices (e.g., a thermostat, an appliance, lights, etc.). For example, the controller 512-1 may be configured to control operation of the network module 514-1 included in the monitoring system control unit 510-1.

The network module 514-1 is a communication device configured to exchange communications over the network 505. The network module 514-1 may be a wireless communication module configured to exchange wireless communications over the network 505. For example, the network module 514-1 may be a wireless communication device configured to exchange communications over a wireless data channel and a wireless voice channel. In this example, the network module 514-1 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514-1 also may be a wired communication module configured to exchange communications over the network 505 using a wired connection. For instance, the network module 514-1 may be a modem, a network interface card, or another type of network interface device. The network module 514-1 may be an Ethernet network card configured to enable the monitoring system control unit 510-1 to communicate over a local area network and/or the Internet. The network module 514-1 also may be a voiceband modem configured to enable the alarm panel to communicate over the telephone lines of Plain Old Telephone Systems (POTS).

The monitoring system that includes the monitoring system control unit 510-1 includes one or more sensors or detectors. For example, the monitoring system may include multiple sensors 520-1. The sensors 520-1 may include a contact sensor, a motion sensor, a glass break sensor, or any other type of sensor included in an alarm system or security system. The sensors 520-1 also may include an environmental sensor, such as a temperature sensor, a water sensor, a rain sensor, a wind sensor, a light sensor, a smoke detector, a carbon monoxide detector, an air quality sensor, etc. The sensors 520-1 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some implementations, the sensors 520-1 may include a radio-frequency identification (RFID) sensor that identifies a particular article that includes a pre-assigned RFID tag.

The monitoring system control unit 510-1 communicates with the module 522-1 and the camera 530-1 to perform surveillance or monitoring. The module 522-1 is connected to one or more devices that enable home automation control. For instance, the module 522-1 may be connected to one or more lighting systems and may be configured to control operation of the one or more lighting systems. Also, the module 522-1 may be connected to one or more electronic locks at the property and may be configured to control operation of the one or more electronic locks (e.g., control Z-Wave locks using wireless communications in the Z-Wave protocol). Further, the module 522-1 may be connected to one or more appliances at the property and may be configured to control operation of the one or more appliances. The module 522-1 may include multiple modules that are each specific to the type of device being controlled in an automated manner. The module 522-1 may control the one or more devices based on commands received from the monitoring system control unit 510-1. For instance, the module 522-1 may cause a lighting system to illuminate an area to provide a better image of the area when captured by a camera 530-1.

The camera 530-1 may be a video/photographic camera or other type of optical sensing device configured to capture images. For instance, the camera 530-1 may be configured to capture images of an area within a building monitored by the monitoring system control unit 510-1. The camera 530-1 may be configured to capture single, static images of the area and also video images of the area in which multiple images of the area are captured at a relatively high frequency (e.g., thirty images per second). The camera 530-1 may be controlled based on commands received from the monitoring system control unit 510-1.

The camera 530-1 may be triggered by several different types of techniques. For instance, a Passive Infra Red (PIR) motion sensor may be built into the camera 530-1 and used to trigger the camera 530-1 to capture one or more images when motion is detected. The camera 530-1 also may include a microwave motion sensor built into the camera and used to trigger the camera 530-1 to capture one or more images when motion is detected. The camera 530-1 may have a "normally open" or "normally closed" digital input that can trigger capture of one or more images when external sensors (e.g., the sensors 520-1, PIR, door/window, etc.) detect motion or other events. In some implementations, the camera 530-1 receives a command to capture an image when external devices detect motion or another potential alarm event. The camera 530-1 may receive the command from the controller 512-1 or directly from one of the sensors 520-1.

In some implementations, the camera 530-1 triggers integrated or external illuminators (e.g., Infra Red, Z-wave controlled "white" lights, lights controlled by the module 522-1, etc.) to improve image quality when the scene is dark. An integrated or separate light sensor may be used to determine if illumination is desired and may result in increased image quality.

The camera 530-1 may be programmed with any combination of time/day schedules, system "arming state", or other variables to determine whether images should be captured or not when triggers occur. The camera 530-1 may enter a low-power mode when not capturing images. In this case, the camera 530-1 may wake periodically to check for inbound messages from the controller 512-1. The camera 530-1 may be powered by internal, replaceable batteries if located remotely from the monitoring control unit 510-1. The camera 530-1 may employ a small solar cell to recharge the battery when light is available. Alternatively, the camera 530-1 may be powered by the controller's 512-1 power supply if the camera 530-1 is co-located with the controller 512-1.

In some implementations, the camera 530-1 communicates directly with the monitoring application server 590 over the Internet. In these implementations, image data captured by the camera 530-1 does not pass through the monitoring system control unit 510-1 and the camera 530-1 receives commands related to operation from the monitoring application server 590.

The sensors 520-1, the module 522-1, and the camera 530-1 communicate with the controller 512-1 over communication links 524, 526-1, and 528-1. The communication links 524, 526-1, and 528-1 may be a wired or wireless data pathways configured to transmit signals from the sensors 520-1, the module 522-1, and the camera 530-1 to the controller 512-1. The sensors 520-1, the module 522-1, and the camera 530-1 may continuously transmit sensed values to the controller 512-1, periodically transmit sensed values to the controller 512-1, or transmit sensed values to the controller 512-1 in response to a change in a sensed value.

The communication links 524, 526-1, and 528-1 may include a local network. The sensors 520-1, the module 522-1, the camera 530-1, and the controller 512-1 may exchange data and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 5 (CAT6) wired Ethernet network. The local network may be a mesh network constructed based on the devices connected to the mesh network.

The central alarm station server 592 is an electronic device configured to provide alarm monitoring service by exchanging communications with the monitoring system control unit 510-1, the one or more mobile devices 540-1, 550, the monitoring application server 590, and the central alarm station server 592 over the network 505. For example, the central alarm station server 592 may be configured to monitor alarm events generated by the monitoring system control unit 510-1. In this example, the central alarm station server 592 may exchange communications with the network module 514-1 included in the monitoring system control unit 510-1 to receive information regarding alarm events detected by the monitoring system control unit 510-1. The central alarm station server 592 also may receive information regarding alarm events from the one or more mobile devices 540-1, 550, and/or the monitoring application server 590.

The central alarm station server 592 is connected to multiple terminals. The terminals may be used by operators to process alarm events. For example, the central alarm station server 592 may route alarm data to the terminals to enable an operator to process the alarm data. The terminals may include general-purpose computers (e.g., desktop personal computers, workstations, or laptop computers) that are configured to receive alarm data from a server in the central alarm station server 592 and render a display of information based on the alarm data. For instance, the controller 512-1 may control the network module 514-1 to transmit, to the central alarm station server 592, alarm data indicating that a sensor 520 detected a door opening when the monitoring system 500 was armed. The central alarm station server 592 may receive the alarm data and route the alarm data to a particular terminal of the one or more terminals for processing by an operator associated with the particular terminal. The particular terminal may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the monitoring application server 590 may route alarm data received from the network module 514-1 or the one or more user devices 540-1, 550 to the central alarm station server 592. For example, the monitoring application server 590 may transmit the alarm data to the central alarm station server 592 over the network 505.

The monitoring application server 590 may store sensor and image data received from the monitoring system and perform analysis of sensor and image data received from the monitoring system. Based on the analysis, the monitoring application server 590 may communicate with and control aspects of the monitoring system control unit 510-1 or the one or more user devices 540-1, 550.

In some implementations, the monitoring application server 590 may activate a collaborative network 580 that enables the monitoring application server 590 to obtain monitoring system data such as image data, sensor data or both from multiple different monitoring systems 510-1 to 510-N that are part of respective local monitoring systems 505-1 to 505-N. The monitoring application server 590 may activate a collaborative network between multiple properties if, for example, users from each of the multiple properties have opted into an object tracking service. The local monitoring systems 505-1 to 505-N may be installed at different respective properties. Once activated, the collaborative network 580 enables to the monitoring application server 590 or central alarm station server 592 to analyze feeds from cameras 530-1 to 530-N as if the cameras 530-1 to 530-N were part of the same local monitoring network. For example, In response to determining that a break-in occurred at a property where location monitoring system 505-1 is installed, the monitoring application server 590 may be being obtaining monitoring system data such as sensor data, image data, or both, generated by sensors 520-N and cameras 530-N.

The monitoring application server 590 is connected to multiple terminals. The terminals may be used by operators to process alarm events. For example, the monitoring application server 590 may route alarm data to the terminals to enable an operator to process the alarm data. The terminals may include general-purpose computers (e.g., desktop personal computers, workstations, or laptop computers) that are configured to receive alarm data from a server in the monitoring application server 590 and render a display of information based on the alarm data. For instance, the controller 512-1 may control the network module 514-1 to transmit, to the monitoring application server 590, alarm data indicating that a sensor 520-1 detected a door opening when the monitoring system was armed. The monitoring application server 590 may receive the alarm data and route the alarm data to the terminal for processing by an operator associated with the terminal. The terminal may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals may be mobile devices or devices designed for a specific function. Although FIG. 5 illustrates two terminals for brevity, actual implementations may include more (and, perhaps, many more) terminals.

In some implementations, the monitoring application server 590 may exchange communications with an emergency service provider to transmit alarm signal data indicating an alarm event taking place within a property where the monitor control unit 510-1 may be located. For instance, the monitoring application server 590 may transmit incident reports in response to the monitor control unit 510-1 detecting an alarm event where a user requires emergency assistance. In such instances, the monitoring application server 590 may be an electronic device that communicates essential safety information to an emergency responder such as an emergency medical responder, a fire department, or a public safety access point.

In some implementations, the monitoring application server 590 may be a third party entity separate from the central alarm station server 592. For example, the monitoring application server 590 may be a central alarm station for a security service provider, a campus security server in a school or school/university police department, or security gateway for a particular residential neighborhood. For instance, the monitoring application server 590 may be registered to the system 500 using a connection bridge such as the application (e.g., the native surveillance application 542-1), using a unique user identifier such as a username and password or a Quick Response (QR). In other instances, the monitoring application server 590 may be registered to users within a particular geographic location (e.g., a gated residential community) where users within the geographical location are registered to a particular monitoring application server 590, a particular central alarm station server 592 of the particular location, or the like.

The one or more user devices 540-1, 550 are devices that host and display user interfaces. For instance, the user device 540-1 is a mobile device that hosts one or more native applications (e.g., the native surveillance application 542-1). The user device 540-1 may be a cellular phone or a non-cellular locally networked device with a display. The user device 540-1 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540-1 may perform functions unrelated to the monitoring system, such as placing personal telephone calls, playing music, playing video, displaying pictures, browsing the Internet, maintaining an electronic calendar, etc.

The user device 540-1 includes a native surveillance application 542-1. The native surveillance application 542-1 refers to a software/firmware program running on the corresponding mobile device that enables the user interface and features described throughout. The user device 540-1 may load or install the native surveillance application 542-1 based on data received over a network or data received from local media. The native surveillance application 542-1 runs on mobile devices platforms, such as iPhone, iPod touch, Blackberry, Google Android, Windows Mobile, etc. The native surveillance application 542-1 enables the user device 540-1 to receive and process image and sensor data from the monitoring system.

The user device 550 may be a general-purpose computer (e.g., a desktop personal computer, a workstation, or a laptop computer) that is configured to communicate with the monitoring application server 590 and/or the monitoring system control unit 510-1 over the network 505. The user device 550 may be configured to display a surveillance monitoring user interface 552 that is generated by the user device 550 or generated by the monitoring application server 590. For example, the user device 550 may be configured to display a user interface (e.g., a web page) provided by the monitoring application server 590 that enables a user to perceive images captured by the camera 530-1 and/or reports related to the monitoring system. Although FIG. 5 illustrates two user devices for brevity, actual implementations may include more (and, perhaps, many more) or fewer user devices.

In some implementations, the one or more user devices 540-1, 550 communicate with and receive monitoring system data from the monitoring system control unit 510-1 using the communication link 538. For instance, the one or more user devices 540-1, 550 may communicate with the monitoring system control unit 510-1 using various local wireless protocols such as Wi-Fi, Bluetooth, Z-Wave, Zig-Bee, HomePlug (Ethernet over powerline), or wired protocols such as Ethernet and USB, to connect the one or more user devices 540-1, 550 to local security and automation equipment. The one or more user devices 540-1, 550 may connect locally to the monitoring system and its sensors and other devices. The local connection may improve the speed of status and control communications because communicating through the network 105 with a remote server (e.g., the monitoring application server 590) may be significantly slower.

Although the one or more user devices 540-1, 550 are shown as communicating with the monitoring system control unit 510-1, the one or more user devices 540-1, 550 may communicate directly with the sensors and other devices controlled by the monitoring system control unit 510-1. In some implementations, the one or more user devices 540-1, 550 replace the monitoring system control unit 510-1 and perform the functions of the monitoring system control unit 510-1 for local monitoring and long range/offsite communication.

In other implementations, the one or more user devices 540-1, 550 receive monitoring system data captured by the monitoring system control unit 510-1 through the network 505. The one or more user devices 540-1, 550 may receive the data from the monitoring system control unit 510-1 through the network 505 or the monitoring application server 590 may relay data received from the monitoring system control unit 510-1 to the one or more user devices 540-1, 550 through the network 505. In this regard, the monitoring application server 590 may facilitate communication between the one or more user devices 540-1, 550 and the monitoring system.

In some implementations, the one or more user devices 540-1, 550 may be configured to switch whether the one or more user devices 540-1, 550 communicate with the monitoring system control unit 510-1 directly (e.g., through link 538) or through the monitoring application server 590 (e.g., through network 505) based on a location of the one or more user devices 540-1, 550. For instance, when the one or more user devices 540-1, 550 are located close to the monitoring system control unit 510-1 and in range to communicate directly with the monitoring system control unit 510-1, the one or more user devices 540-1, 550 use direct communication. When the one or more user devices 540-1, 550 are located far from the monitoring system control unit 510-1 and not in range to communicate directly with the monitoring system control unit 510-1, the one or more user devices 540-1, 550 use communication through the monitoring application server 590.

Although the one or more user devices 540-1, 550 are shown as being connected to the network 105, in some implementations, the one or more user devices 540-1, 550 are not connected to the network 505. In these implementations, the one or more user devices 540-1, 550 communicate directly with one or more of the monitoring system components and no network (e.g., Internet) connection or reliance on remote servers is needed.

In some implementations, the one or more user devices 540-1, 550 are used in conjunction with only local sensors and/or local devices in a house. In these implementations, the system 500 only includes the one or more user devices 540-1, 550, the sensors 520-1, the module 522-1, and the camera 530-1. The one or more user devices 540-1, 550 receive data directly from the sensors 520-1, the module 522-1, and the camera 530-1 and sends data directly to the sensors 520-1, the module 522-1, and the camera 530-1. The one or more user devices 540-1, 550 provide the appropriate interfaces/processing to provide visual surveillance and reporting.

In other implementations, the system 500 further includes network 505 and the sensors 520-1, the module 522-1, and the camera 530-1 are configured to communicate sensor and image data to the one or more user devices 540-1, 550 over network 505 (e.g., the Internet, cellular network, etc.). In yet another implementation, the sensors 520-1, the module 522-1, and the camera 530-1 (or a component, such as a bridge/router) are intelligent enough to change the communication pathway from a direct local pathway when the one or more user devices 540-1, 550 are in close physical proximity to the sensors 520-1, the module 522-1, and the camera 530-1 to a pathway over network 505 when the one or more user devices 540-1, 550 are farther from the sensors 520-1, the module 522-1, and the camera 530-1. In some implementations, the system leverages GPS information from the one or more user devices 540-1, 550 to determine whether the one or more user devices 540-1, 550 are close enough to the sensors 520-1, the module 522-1, and the camera 530-1 to use the direct local pathway or whether the one or more user devices 540-1, 550 are far enough from the sensors 520-1, the module 522-1, and the camera 530-1 that the pathway over network 505 is required. In other examples, the system leverages status communications (e.g., pinging) between the one or more user devices 540-1, 550 and the sensors 520-1, the module 522-1, and the camera 530-1 to determine whether communication using the direct local pathway is possible. If communication using the direct local pathway is possible, the one or more user devices 540-1, 550 communicate with the sensors 520-1, the module 522-1, and the camera 530-1 using the direct local pathway. If communication using the direct local pathway is not possible, the one or more user devices 540-1, 550 communicate with the sensors 520-1, the module 522-1, and the camera 530-1 using the pathway over network 505.

In some implementations, the system 500 provides end users with access to images captured by the camera 530-1 to aid in decision making. The system 500 may transmit the images captured by the camera 530-1 over a wireless WAN network to the user devices 540-1, 550. Because transmission over a wireless WAN network may be relatively expensive, the system 500 uses several techniques to reduce costs while providing access to significant levels of useful visual information.

In some implementations, a state of the monitoring system and other events sensed by the monitoring system may be used to enable/disable video/image recording devices (e.g., the camera 530-1). In these implementations, the camera 530-1 may be set to capture images on a periodic basis when the alarm system is armed in an "Away" state, but set not to capture images when the alarm system is armed in a "Stay" state or disarmed. In addition, the camera 530-1 may be triggered to begin capturing images when the alarm system detects an event, such as an alarm event, a door opening event for a door that leads to an area within a field of view of the camera 530-1, or motion in the area within the field of view of the camera 530-1. In other implementations, the camera 130 may capture images continuously, but the captured images may be stored or transmitted over a network when needed.

In some implementations, the drone devices 570 and 572 may analyze the images captured during the scan of a property for the presence of persons in the captured images. For instance, the drone devices 570 and 572 may use image processing techniques in an attempt to identify shapes in the captured images that resemble a human body. The drone devices 570 and 572 also may analyze the images for moving objects (or use other techniques to identify moving objects) and target imaging on capture of moving objects.

The invention claimed is:

1. A computer-implemented method comprising:
receiving, from a first monitoring system that is configured to monitor a first property, a request for a tracking update for an object;
determining that the first monitoring system is authorized to track the object, including:
accessing a set of rules restricting access to tracking updates for an object type of the object; and
determining that the set of rules indicates that the first monitoring system has access to tracking updates for the object type;
providing, to a second monitoring system that is configured to monitor a second property, an image model of the object;
receiving, from the second monitoring system, tracking data for the object; and
transmitting, (i) to the first monitoring system and (ii) using the tracking data for the object, the tracking update for the object.

2. The method of claim 1, wherein the request for the tracking update for the object includes the image model of the object.

3. The method of claim 1, wherein providing, to the second monitoring system, the image model of the object is performed in response to determining that the first monitoring system is authorized to track the object.

4. The method of claim 1, wherein providing, to the second monitoring system, the image model of the object is performed in response to determining that a user account of a second monitoring system has opted in for object tracking.

5. The method of claim 1, comprising determining, using the tracking data for the object, a location of the object,
wherein the tracking update for the object indicates the location of the object.

6. The method of claim 1, comprising determining, using the tracking data for the object, that a current route of the object has deviated from a predicted route of the object,
wherein the tracking update for the object indicates that the current route of the object has deviated from the predicted route.

7. The method of claim 1, comprising determining that the tracking data received from the second monitoring system indicates that the object is being followed by another object,
wherein the tracking update for the object indicates that the object is being followed by the other object.

8. The method of claim 1, comprising:
aggregating tracking data from multiple different monitoring systems including the second monitoring system; and
generating the tracking update for the object using the aggregated tracking data.

9. The method of claim 1, wherein the image model of the object includes a set of image features extracted from an image, wherein the set of image features extracted from the image identifies the object.

10. The method of claim 1, wherein the image model of the object includes a neural network that has been trained to determine whether an obtained image, provided as an input to the neural network, depicts a particular object type.

11. The method of claim 1, wherein the image model of the object includes a representation of an image that, when presented on a display, provides an obfuscated representation of the image depicting the object.

12. The method of claim 1, wherein the tracking data includes data indicating that an image obtained by a camera of the second monitoring system satisfies similarity criteria to the image model of the object.

13. The method of claim 1, wherein the tracking data includes data indicating a location of a camera of the second monitoring system that captured an image of the object.

14. The method of claim 1, comprising:
receiving, from a third monitoring system that is configured to monitor a third property, a second request for the tracking update for the object;
determining that the third monitoring system is not authorized to track the object; and
in response to determining that the third monitoring system is not authorized to track the object, determining not to transmit another tracking update for the object to the third monitoring system.

15. The method of claim 1, wherein the object comprises a first object, the method comprising:
receiving, from the first monitoring system, a second request for a tracking update for a second object;
determining that the first monitoring system is not authorized to track the second object; and
in response to determining that the first monitoring system is not authorized to track the second object, determining not to provide the tracking update for the second object to the first monitoring system.

16. A system comprising:
one or more processors; and
one or more computer storage media storing instructions that are operable, when executed by the one or more processors, to cause the one or more processors to perform operations comprising:
receiving, from a first monitoring system that is configured to monitor a first property, a request for a tracking update for an object;
determining that the first monitoring system is authorized to track the object including:
accessing a set of rules restricting access to tracking updates for an object type of the object; and
determining that the set of rules indicates that the first monitoring system has access to tracking updates for the object type;
providing, to a second monitoring system that is configured to monitor a second property, an image model of the object;
receiving, from the second monitoring system, tracking data for the object; and
transmitting, (i) to the first monitoring system and (ii) using the tracking data for the object, the tracking update for the object.

17. The system of claim 16, wherein the request for the tracking update for the object includes the image model of the object.

18. A non-transitory computer-readable medium storing software comprising instructions executable by one or more computers which, upon such execution, cause the one or more computers to perform operations comprising:
receiving, from a first monitoring system that is configured to monitor a first property, a request for a tracking update for an object;
determining that the first monitoring system is authorized to track the object, including:
accessing a set of rules restricting access to tracking updates for an object type of the object; and
determining that the set of rules indicates that the first monitoring system has access to tracking updates for the object type;

providing, to a second monitoring system that is configured to monitor a second property, an image model of the object;

receiving, from the second monitoring system, tracking data for the object; and transmitting, (i) to the first monitoring system and (ii) using the tracking data for the object, the tracking update for the object.

* * * * *

UNITED STATES PATENT AND TRADEMARK OFFICE
CERTIFICATE OF CORRECTION

PATENT NO. : 11,854,357 B2
APPLICATION NO. : 18/104401
DATED : December 26, 2023
INVENTOR(S) : Donald Madden, Daniel Todd Kerzner and Stephanie Sun Kinney It is certified that error appears in the above-identified patent and that said Letters Patent is hereby corrected as shown below:

In the Specification

Column 1, Line 11, delete "claims the benefit of claims the benefit of" and insert -- claims the benefit of --.

Signed and Sealed this
Thirteenth Day of February, 2024

Katherine Kelly Vidal

Katherine Kelly Vidal
*Director of the United States Patent and Trademark Office*